United States Patent [19]
Lisec

[11] Patent Number: 5,209,627
[45] Date of Patent: May 11, 1993

[54] APPARATUS FOR SORTING CUT GLASS SHEETS

[76] Inventor: Peter Lisec, Bahnhofstrasse 34, A-3363 Amstetten-Hausmening, Austria

[21] Appl. No.: 758,006

[22] Filed: Sep. 12, 1991

[30] Foreign Application Priority Data

Sep. 18, 1990 [AT] Austria .................................. 1897/90
Apr. 19, 1991 [DE] Fed. Rep. of Germany ... 9104816[U]

[51] Int. Cl.⁵ ...................... B65G 47/84; B65G 49/06; B65G 65/16
[52] U.S. Cl. .................... 414/398; 198/408; 414/399
[58] Field of Search ................ 414/352, 353, 390–393, 414/398, 399; 198/408, 412, 413

[56] References Cited

U.S. PATENT DOCUMENTS

| | | | |
|---|---|---|---|
| 1,324,785 | 12/1919 | Bechtel | 414/399 X |
| 3,506,136 | 4/1970 | Burda et al. | 414/399 X |
| 4,106,647 | 8/1978 | Robert | 198/413 X |
| 4,555,215 | 11/1985 | Raasch et al. | 414/398 X |
| 4,586,326 | 5/1986 | Igel | 414/392 X |
| 4,810,155 | 3/1989 | D'Agnolo | 414/399 X |
| 4,886,410 | 12/1989 | Lisec | 414/391 X |
| 5,035,315 | 7/1991 | Fukusaki et al. | 198/408 X |
| 5,040,662 | 8/1991 | Clark et al. | 198/408 |

FOREIGN PATENT DOCUMENTS

| | | |
|---|---|---|
| 0048334 | 3/1984 | European Pat. Off. . |
| 2539352 | 2/1979 | Fed. Rep. of Germany . |
| 267012 | 4/1989 | Fed. Rep. of Germany . |
| 1386541 | 4/1988 | U.S.S.R. ............................. 414/399 |

Primary Examiner—David A. Bucci
Attorney, Agent, or Firm—Young & Thompson

[57] ABSTRACT

For sorting cut glass sheets (3) in accordance with arbitrary order criteria, rack-type carts (20) are provided exhibiting several racks (21) for the accommodation of cut glass sheets (3). The cut glass sheets (3) are righted by a lifting device into an essentially vertical position and then inserted by a conveyor arranged at the lifting device in the respectively desired rack (21) of the first rack-type cart (20). Each rack (21) exhibits on one side freely rotatable supporting rollers for the cut glass sheet. These supporting rollers can also be mounted to a holder adjustable relative to the rack-type cart (20). The rack-type carts (20) are displaceable (double arrow 30) so that the respectively desired rack (21) can be aligned with respect to the lifting device and/or the cut glass sheet (3) held by the latter. It is possible to provide several rack-type carts (20) arranged in series and displaceable independently of one another wherein the rack-type carts (20) arranged farther to the rear are charged by providing that a rack (21) of the forward rack-type carts (20) is kept vacant for transporting cut glass sheets (3) therethrough.

20 Claims, 5 Drawing Sheets

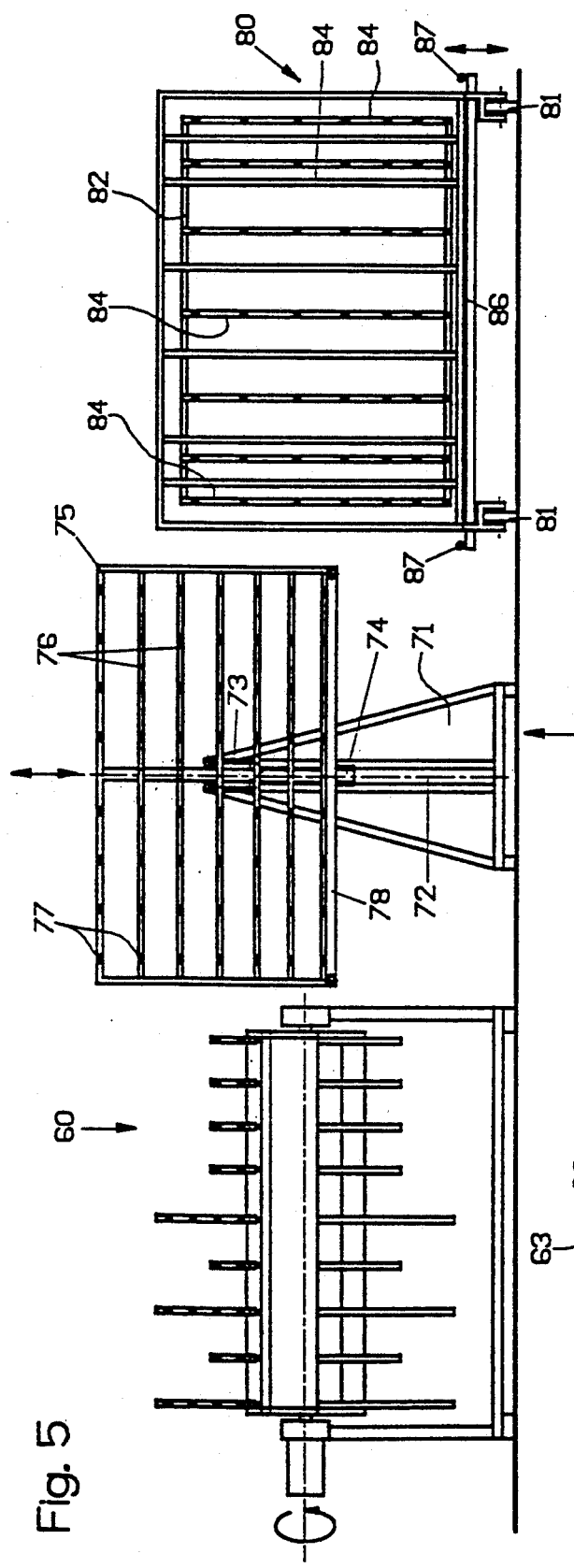
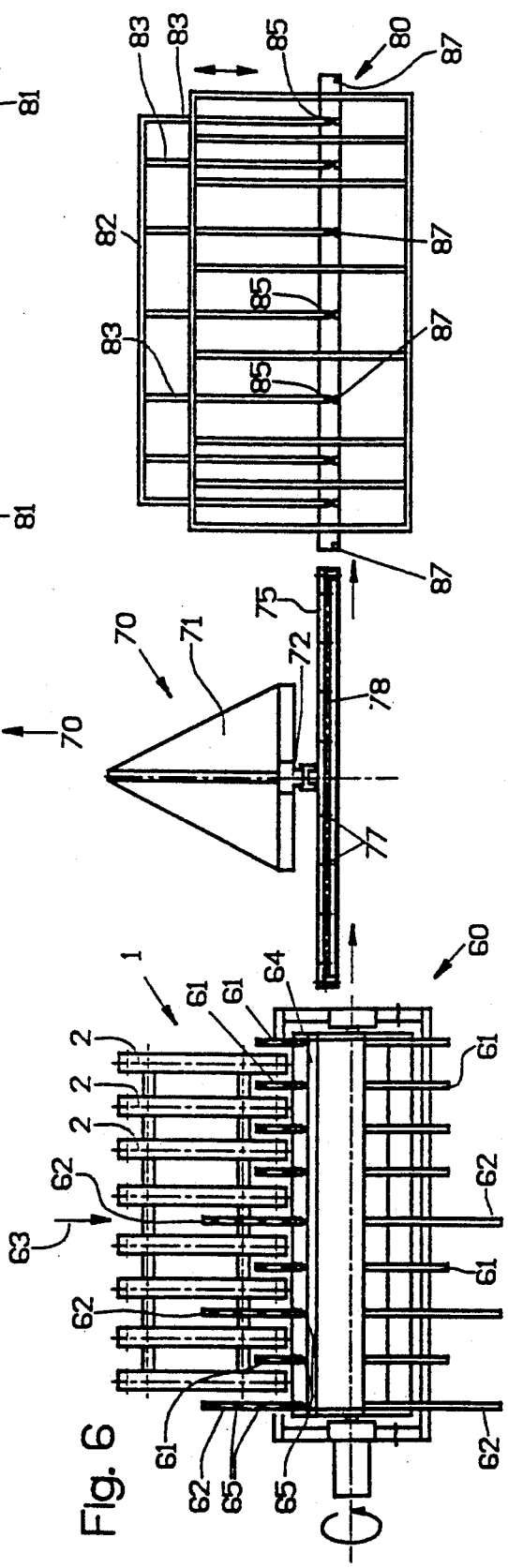
Fig. 5
Fig. 6

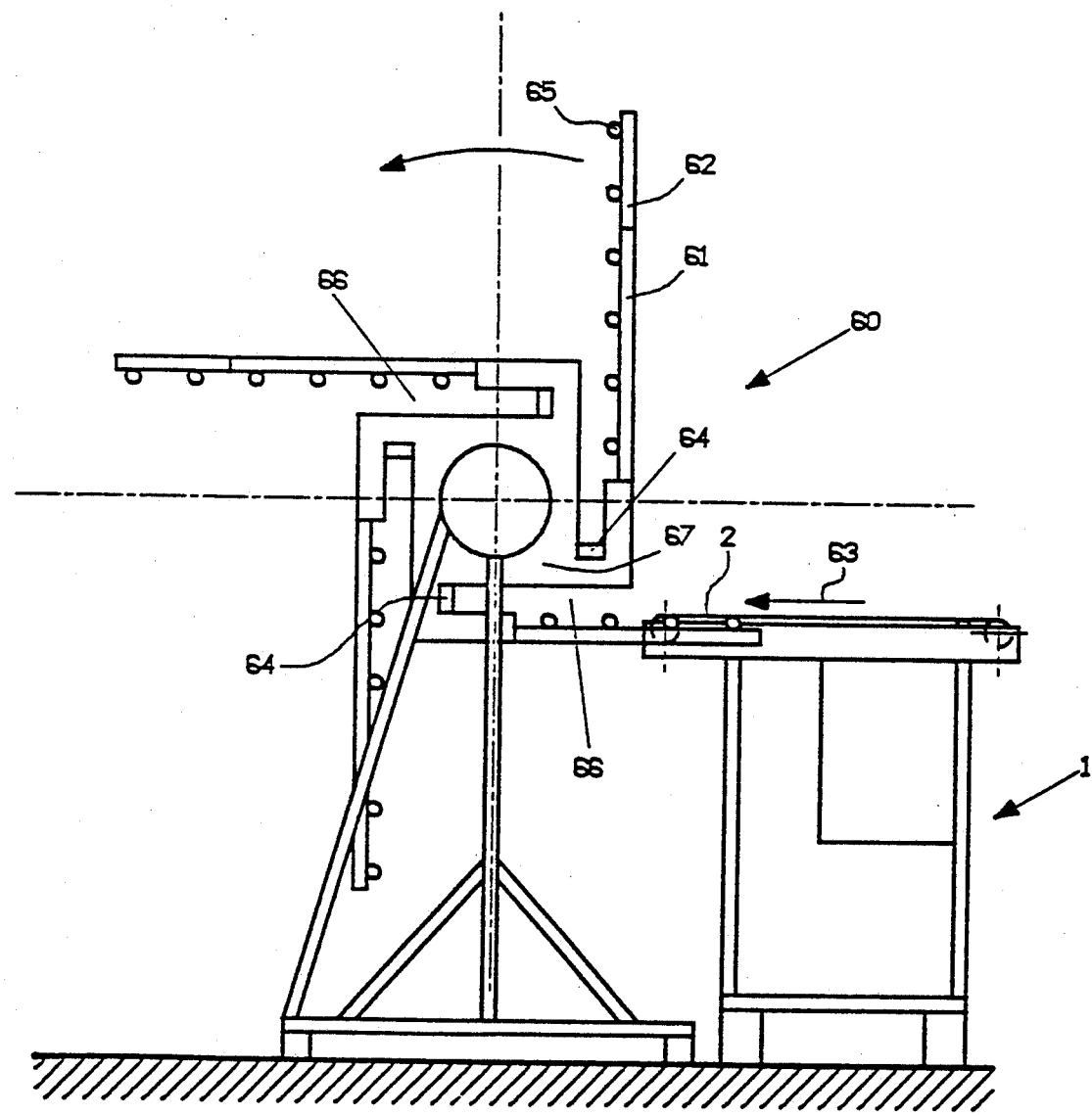
Fig..7

APPARATUS FOR SORTING CUT GLASS SHEETS

FIELD OF THE INVENTION

The invention relates to an apparatus for sorting cut glass sheets, with a lifting device equipped with lifting arms for cut glass sheets fed thereto on a conveyor table wherein the lifting device can be swiveled about an axis extending in parallel to a rim of the cut glass sheets and exhibits a conveyor for transporting the cut glass sheets along one rim, and with at least one rack-type cart comprising several racks for receiving respectively one cut glass sheet and movable transversely to the plane wherein the cut glass sheets are fed to this cart.

BACKGROUND OF THE INVENTION

Glass cutting machines wherein sheet glass is divided in correspondence with the required formats, i.e. wherein cut glass sheets are produced, divide glass sheets in accordance with an optimization program considering solely a maximally favorable exploitation of the available glass area. The optimization programs of glass cutting machines do not take into account the fact whether or not the cut sheets to be produced pertain to a specific shipment consisting of several cut glass sheets.

For this reason, the cut glass sheets of glass cutting plants are delivered in a completely disorderly fashion as regards their utilization or their association with a specific order and/or shipment.

The subsequent sorting of the cut glass sheets represents an extraordinarily expensive operation which moreover occupies a large amount of space since several storing areas are required for the cut glass sheets. Since, furthermore, cut glass sheets can also exhibit relatively large formats, it is necessary for their handling to provide either several operators or lifting mechanisms.

DD-A1-267,012 discloses an apparatus for the transferring of cut glass sheets, by means of which cut glass sheets can be tilted about an axis extending in parallel to a rim of the cut glass sheets from a horizontal position into an essentially vertical position.

DE-B-2,539,352 describes an apparatus, by means of which insulating glass panes fed in substantially horizontal alignment while lying on a roller track are swung upwardly by a tilting table into a substantially vertical position. After the upward pivoting, the insulating glass panes in the conventional arrangement rest with the rim which is then located at the bottom on conveyor rolls and are inserted in a compartment of a rack-type cart movable, for selecting the corresponding compartment, perpendicularly to the feeding direction of the pane. The rack-type cart disclosed in DE-B-2,539,352, provided beside the tilting table, has compartments formed by perforated plates wherein the rack-type cart, after insertion of an insulating glass pane in a compartment, is shifted cyclically so that all compartments can be filled in due course of time.

EP-B-48,334 discloses an apparatus for sorting cut glass sheets of a glass cutting plant with a rack-type cart movable on a rail track having several racks and a rack shelf with several compartments. In this arrangement, the provision is made that a righting device is located at the end of a device for cutting glass sheets, this righting device setting the cut glass sheets upright and then delivering the latter via a conveyor in succession into the compartments of the rack-type cart. As soon as a rack-type cart is filled completely in EP-B-48,334, a new rack-type cart is connected to the delivery station at the end of the glass cutting line, and is filled up.

The apparatus known from EP-B-48,334 has the drawback that the rack-type cart must execute a large number of movements in order to fill the individual compartments of the rack shelf.

SUMMARY OF THE INVENTION

The invention is based on the object of indicating an apparatus of the type discussed in the foregoing, by means of which cut glass sheets can be sorted in accordance with the respectively desired order criterion, without any great expenditure.

For attaining this object, the apparatus for sorting cut glass sheets is characterized in that at least one rack of the rack-type cart is associated with a linear conveyor for inserting the cut glass sheets in the rack; that the remaining racks are associated with freely rotatable, optionally lockable, supporting rollers or supports engaging at the bottom rim of the cut glass sheets; and that the rack-type cart is associated with respectively one, especially rake-like, holder for supporting rollers which latter can be brought into contact with the lateral surfaces of the cut glass sheets.

By means of the apparatus according to the invention, the cut glass sheets delivered by the glass cutting facility are transferred from the delivery conveyor of the glass cutting facility by means of the lifting device, equipped, for example, with lifting arms arranged in a rake-type fashion, are set on edge (tilted), and then are inserted in the desired compartment of a rack-type cart. Friction on the lateral supports and/or boundaries of the racks of the rack-type cart during insertion of the cut glass sheets is minor in this invention since the rack cart, or each of the rack carts, is associated with a holder, especially of a rake-like shape, for supporting rollers that can be brought into contact with the lateral surfaces of the cut glass sheets.

The invention makes it possible not only to sort a relatively large number of cut glass sheets, but also to correspondingly sort several cut glass sheets which belong together.

In one embodiment of the invention, the provision is made that the lifting device is associated with a conveying table having a conveyor constituted preferably by several conveyor belts, for transporting the cut glass sheets transversely to their rims. This embodiment has the advantage that the lifting arms of the lifting device engage in between the conveyors of the conveying table and, during the upward swiveling, can lift a cut glass sheet fed by the conveyor off from the latter.

In a practical embodiment of the invention, the provision can be made that the conveyor means at the lifting device, especially the conveyor rollers of the roller track of the lifting device, form, in the position aligned in parallel to the conveying table, the end stop for the feeding of cut glass sheets.

In one embodiment of the apparatus according to this invention, the provision is made that several successively arranged rack carts are included which are movable independently of one another transversely to the conveying plane of the cut glass sheets, i.e. transversely to the plane wherein the cut glass sheets are held by the lifting device in their upwardly swung position. In this embodiment with several series-arranged and transversely movable rack carts, the cut glass sheets can be distributed into several racks without interfering with the work flow. In this arrangement, the procedure is usually such that respectively one compartment of a rack cart (except for the final rack cart of a group) is kept vacant for the through transport of cut glass sheets to the subsequently located rack cart. This will primarily be the compartment equipped with a conveying means. Since the rack carts are adjustable independently of one another, sorting of the cut glass sheets can be executed without any problems inasmuch as the desired rack can be aligned in the conveying plane of the cut glass sheets.

Various possibilities exist for the movability of the rack cart or of the rack carts transversely to the feeding plane of the cut glass sheets. In one embodiment of the invention, the provision is made that the rack cart or the rack carts are set up on undercarriages movable with the aid of a drive mechanism transversely to the conveying plane of the cut glass sheets, i.e. transversely to the plane wherein the cut glass sheets are held by the lifting device in their upwardly swung position. As soon as a rack cart has been charged with cut glass sheets, the cart is lifted off the undercarriage and can be transported to facilities, e.g. a facility for the manufacture of insulating glass panes, wherein the cut glass sheets are needed.

As an alternative, the provision can be made that the rack cart or carts exhibit wheels at the bottom, which wheels are received in guide rails, and that a clutch is arranged at each of the rack carts, by means of which the rack cart can be adjusted transversely to the racks with a drive mechanism for moving the rack cart.

The apparatus of this invention can be furthermore distinguished by the feature that the linear conveyor, preferably exhibiting several conveying rollers, can be lifted into its operative position wherein it projects into the rack at the bottom. In this way, the cut glass sheets can be simply inserted in the respective compartment of the rack cart.

The linear conveying means in the apparatus of this invention is mounted either to the undercarriage or on the ground, to be liftable and lowerable.

In a practical embodiment of the invention, the provision can be made that the racks in the rack cart are defined by tensioned rods or cables.

In order to further facilitate the insertion of the cut glass sheets in the racks of the rack cart, it proved to be advantageous to arrange freely rotatable supporting rollers engaging on a lateral surface of the cut glass sheets along a lateral boundary of each rack.

The cut glass sheets can be supported in the racks from the bottom by the feature that the racks are defined at the bottom by mutually spaced-apart supports.

In this embodiment, the provision is made advantageously to arrange the conveying rollers of the linear conveyor between the supports and/or the supporting rollers to be liftable and lowerable.

If furthermore, as proposed by the invention, the provision is made that the holder can be adjusted by moving the holder and/or the rack carts transversely to the racks of the rack carts, then a (rake-like) holder for respectively one rack cart is sufficient; in this connection, the advantage is additionally obtained that the cut glass sheets, once the rake-like holder with the laterally engageable supporting rollers has been removed from the region of a rack, are in contact with the lateral boundaries of the rack and, on account of increased friction against the rack, cannot slide out.

In order to facilitate insertion of cut glass sheets in the respectively desired compartment, the provision can be made within the scope of the invention that supporting rollers engaging the bottom rims of the cut glass sheets are arranged at the free, lower ends of the arms of the rake-type holder. In addition, the provision can be made that the supporting rollers are equipped with a drive mechanism.

For reasons of space, it may be advantageous to arrange a fixture, e.g. a movable wagon, between the lifting device tilting the cut glass sheets upwardly and the (first) rack-type cart, for transporting cut glass sheets from the lifting device to the (first) rack-type cart. In this embodiment, the cut glass sheets are not directly inserted by the lifting device into a rack of the (first) rack cart, but rather are initially deposited on the fixture and then transported by the latter, optionally together with several other cut glass sheets. On this fixture, the cut glass sheets rest with those surfaces on a lateral support constituted, for example, by an array of rollers, which surfaces were previously in contact with the lifting arms of the lifting device. The fixture can exhibit a bottom support for the cut glass sheets deposited thereon, fashioned, for example, as a conveyor roller track made up of drivable rollers.

BRIEF DESCRIPTION OF THE DRAWINGS

Additional details and features of the invention can be seen from the following description, reference being had to the drawings showing embodiments in schematic views. In the drawings:

FIG. 5 shows a combined apparatus for sorting purposes, from the front, FIG. 6 shows the apparatus of FIG. 5 from the top, and FIG. 7 shows a view of the lifting device according to FIGS. 5 and 6 from the right-hand side.

DETAILED DESCRIPTION OF THE INVENTION

Figure 1:
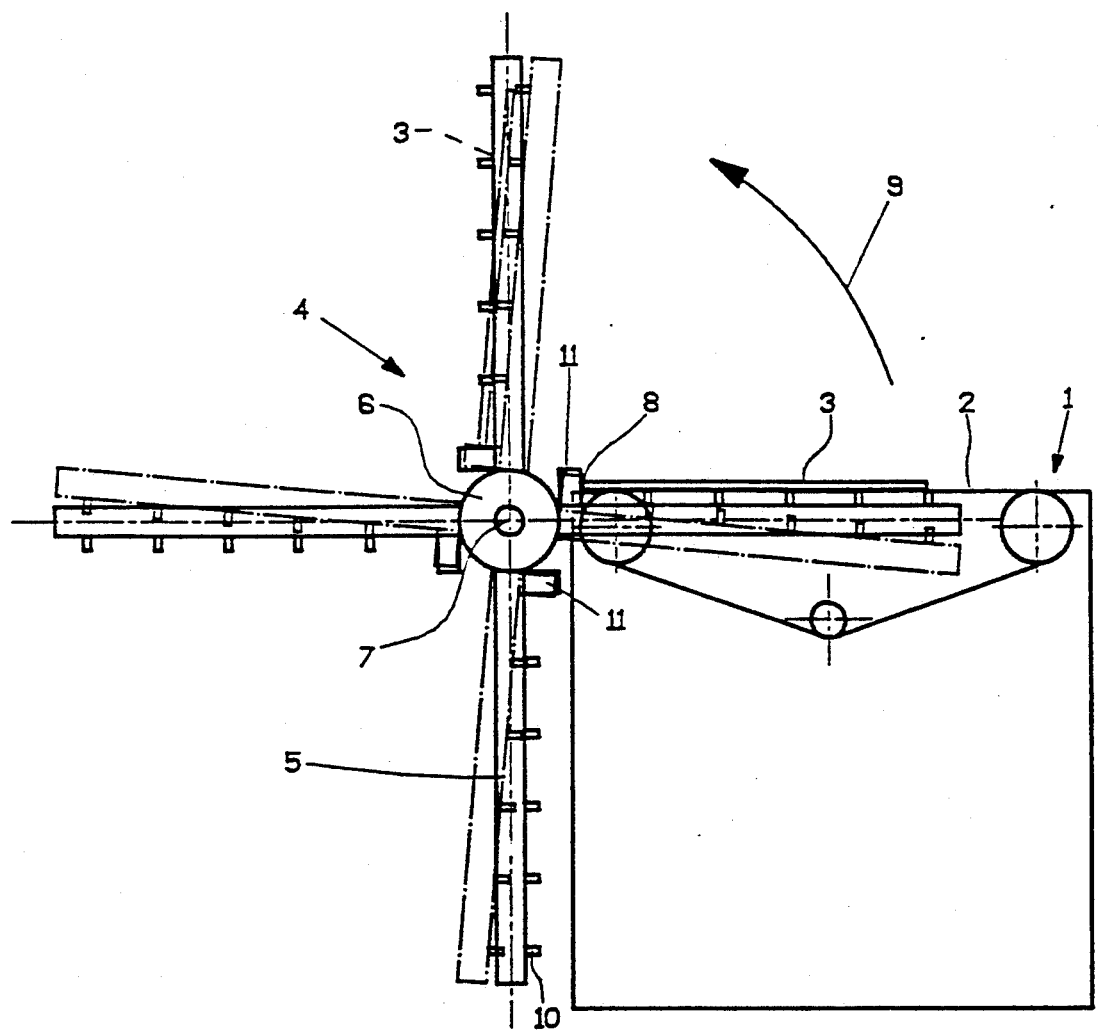
FIG. 1 shows a lifting device with a conveying table associated with the former.

Cut glass sheets 3 from a glass cutting facility are fed to a conveying table 1 equipped with several endless conveyor belts 2. The cut glass sheets 3 are transported to the end of the conveying table 1 on the delivery side by the conveyor belts 2 which latter are set into motion by a preferably joint drive mechanism, not illustrated in detail.

A lifting device 4 is provided beside the end of the conveying table 1 on the delivery side; in the illustrated embodiment, this lifting device exhibits four groups of lifting arms 5 of rake-like arrangements. The lifting arms 5 of each group are attached to a shaft 6 in a freely cantilevered fashion and can be swung upwards in the direction of arrow 9 by rotation of the shaft 6 about its axis 7 which latter is oriented in parallel to the adjacent rim 8 of a cut glass sheet 3. For this purpose, the lifting device 4 is coupled with a drive mechanism, not shown.

Freely rotatable rollers 10 are attached to each lifting arm 5 of the lifting device 4, and drivable conveying rollers 11 are arranged at the ends of the arms adjacent to the shaft 4. As illustrated in FIG. 1, the conveying rollers 11 simultaneously serve as a stop for the rim 8 of the cut glass sheet 3 and thus define the end position of the movement of the cut glass sheets 3 on the conveying table 1.

By turning the lifting device 4 in the direction of arrow 9, a cut glass sheet 3 can be swung from its horizontal position wherein it lies on the conveyor belts 2 of the conveying table 1 into an upright position wherein the cut glass sheet 3 forms with the vertical an acute angle of preferably 3°-6°, as shown in dot-dash lines in FIG. 1. In this position, the cut glass sheets 3 rest on the supporting rollers 10 and are carried on the bottom by the conveying rollers 11.

After carrying the righted cut glass sheet 3 away transversely to the plane of the drawing of FIG. 1, i.e. essentially in the direction of the axis 7 of the shaft 6 pertaining to the lifting device 4, the lifting device 4 is rotated another increment so that the lifting arms 5 of the subsequent group of lifting arms 5 engage between the conveyor belts 2 of the conveying table 1, and the plane formed by the supporting rollers 10 on the lifting arms 5 lies in parallel to the conveying plane of the conveyor belts 2. By another rotation of the lifting device 4, the next cut glass sheet 3, which had already been supplied before the lifting arms 5 were aligned in parallel to the conveying plane of the conveying table 1, can be lifted off the conveying table 1 and can be righted into its substantially vertical position.

The lifting device 4 is associated with a first rack-type cart exhibiting several racks 21 for the accommodation of cut glass sheets 3. The racks 21 of the rack cart 20 are constituted by tensioned rods or cables 22. For tensioning the rods or cables 22, short springs 23 are inverted over their ends projecting out of the upper frame section of the rack cart 20; these springs can be tensioned with the aid of nuts 24. The lower boundary of the racks 21 is formed either by spaced apart, optionally drivable rollers or by fixed supports arranged at mutual spacings.

In order to facilitate insertion of the cut glass sheets 3 in the direction of arrow 25 in the racks 21, freely rotatable rollers or balls can be arranged at the rods or cables 22.

Figure 2:
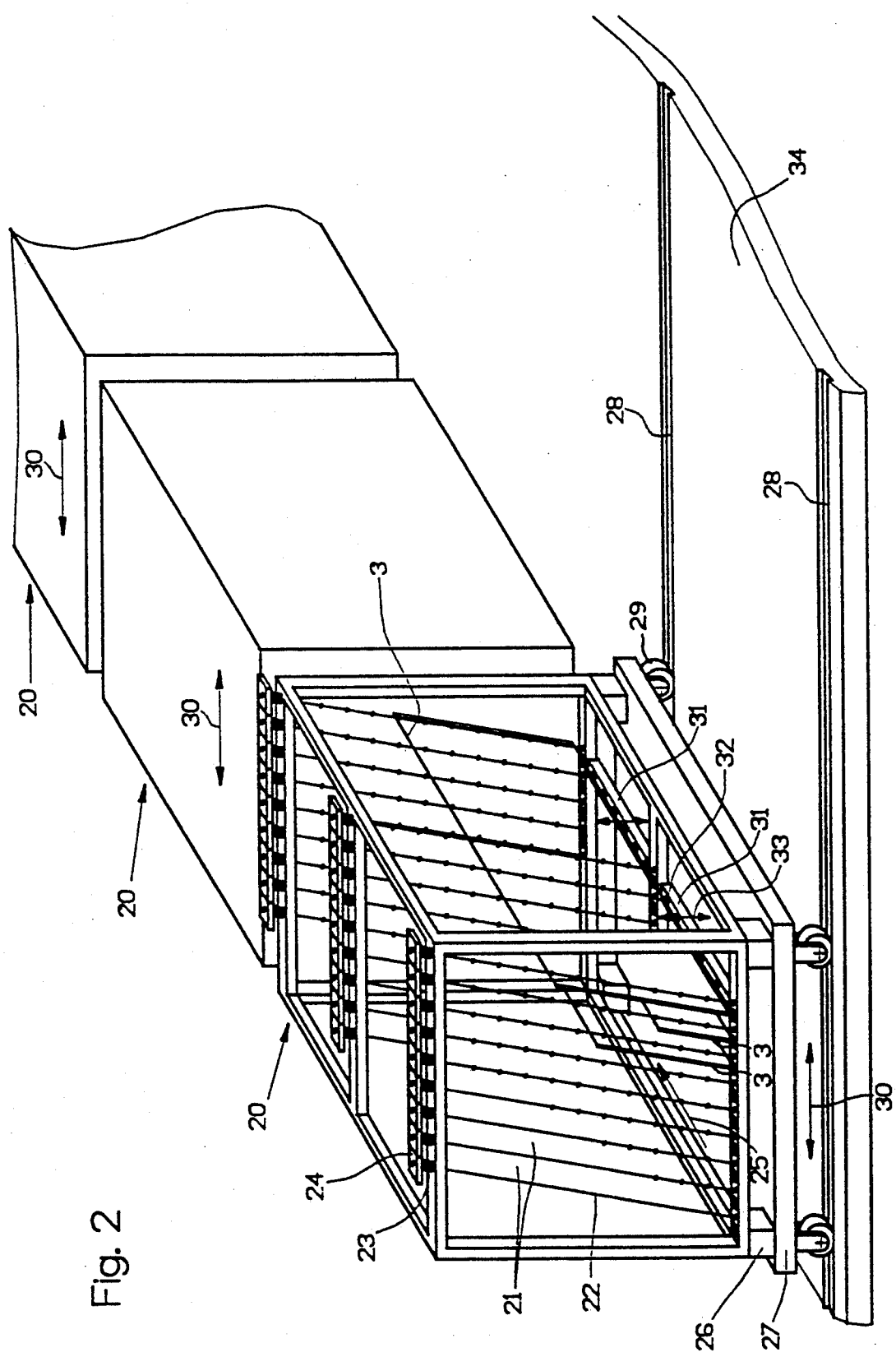
FIG. 2 shows an embodiment for rack carts in an oblique view.

In the embodiment shown in FIG. 2, the rack cart 20 has feet 26 at the bottom, by way of which the cart is resting on an undercarriage 27. The undercarriage 27 can travel to and fro by way of wheels 29 running in tracks 28 in the direction of the double arrow 30 so that each rack 21 of the rack cart 20 can be aligned with respect to the upright group of lifting arms 5 of the lifting device 4.

As illustrated in FIG. 2, at least one rack 21 of the rack cart 20 is associated with a linear conveyor 31 comprising several upwardly pointing conveying rollers 32. The linear conveyor 31 can be raised in the direction of double arrows 33 into the lower region of a rack 21 and can thus support the movement of a cut glass sheet 3 into the rack 21 of the rack cart 20. During this step, the rollers 32 of the linear conveyor 31 engage in between the lower supporting elements (supports or rollers) associated with the rack, and the rollers 32 engage at the lower rim 8 of the cut glass sheet 3.

Such a linear conveyor 31 can be provided for every rack of the rack cart 20, or a linear conveyor 31 is set up on the floor 34 to be raisable so that it can be selectively associated with each of the racks 21 of the rack cart 20 by shifting the rack cart 20 in the direction of double arrow 30.

For displacing the rack cart 20 in the direction of double arrow 30, the undercarriage 27 is coupled with a drive mechanism, not shown. This drive mechanism can be a rack-and-pinion drive or an endless belt drive, preferably a toothed belt drive, which is operated in order to align the desired compartment 21 of the rack cart 20 with respect to the set-up group of lifting arms 5 of the lifting device 4.

As illustrated in FIG. 2, several rack carts 20 are arranged in series. This increases the available number of racks 21 and thus the possibilities of placing cut glass sheets 3 in order. During charging of the rack carts 20 with cut glass sheets 3, one rack 21 of each rack cart 20, except for the final rack cart 20, is kept vacant for passing cut glass sheets 3 through to the subsequent rack cart 20.

The rack carts 20 of a series of rack carts 20 are movable independently of one another in the direction of double arrow 30 so that the cut glass sheets 3 can be moved into any desired compartments 21 of each of the rack carts 20.

It can be seen from FIGS. 1 and 2 that the surface of the cut glass sheet 3 that points upwardly on the conveying table 1 will also remain free at all times during the further handling of the cut glass sheet 3, i.e. no supporting or conveying elements are in contact with this surface. This is advantageous insofar as, for example, coated cut glass sheets 3 can be conveyed and sorted without the danger of damage to the coating of the cut glass sheets 3 due to engaging conveying means or supporting elements.

Figure 3:
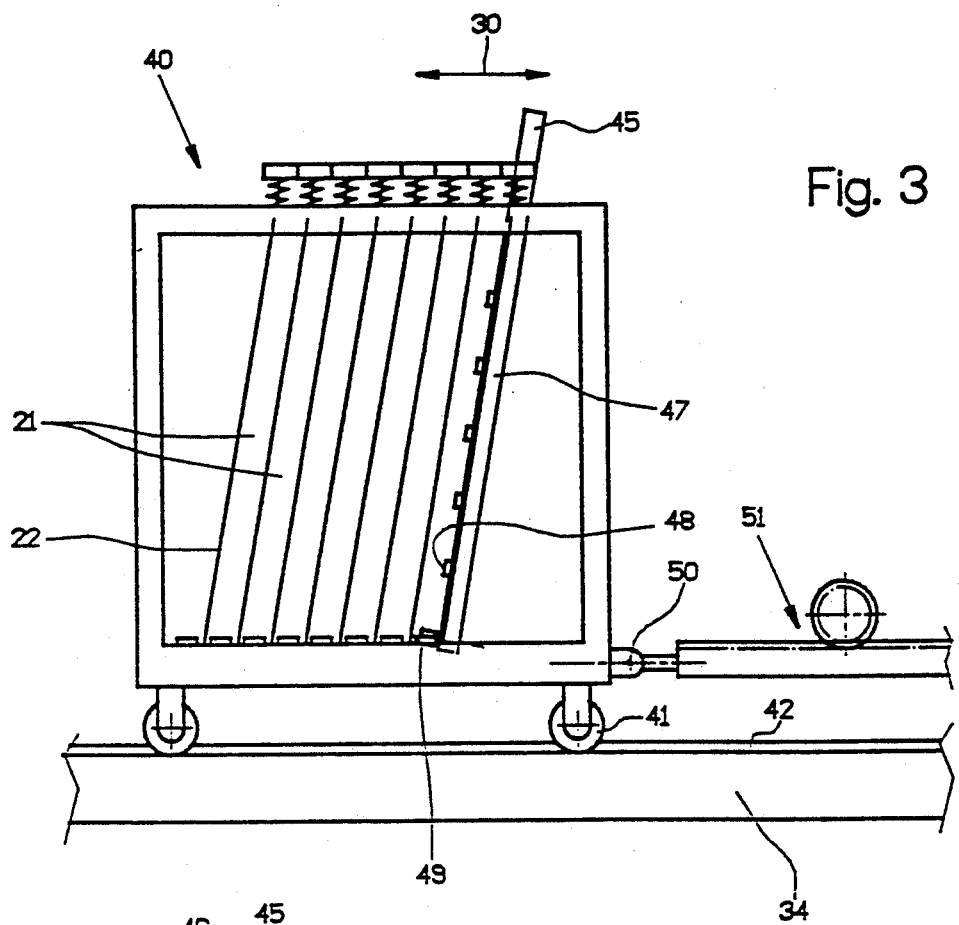
FIG. 3 shows another embodiment of a rack cart.
Figure 4:
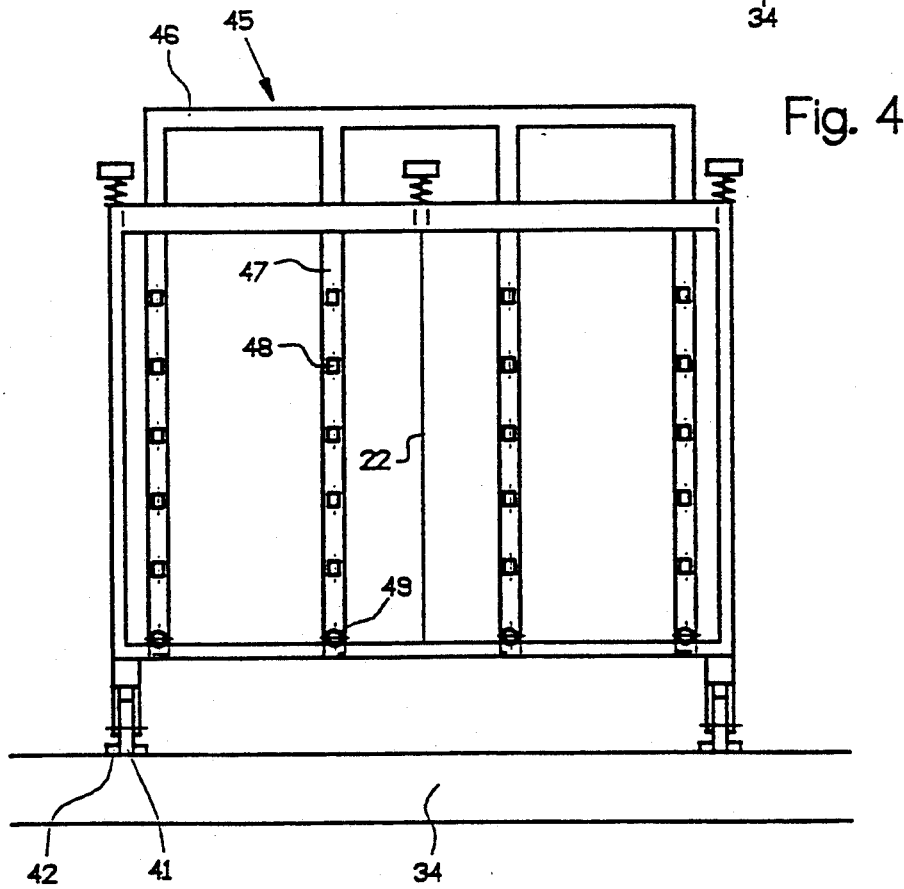
FIG. 4 shows the rack cart of FIG. 3 as seen from the left-hand side of FIG. 3.

The rack cart 40 of the embodiment illustrated in FIGS. 3 and 4 is of a similar structure as the rack cart 20 of the embodiment according to FIG. 2, with the difference that the cart is here directly movable on the floor 34 by means of wheels 41. In order to provide exact guidance for the rack cart 40, the wheels 41 are received in between guide rails 42, or U-shaped profile members are mounted on the floor 34 wherein the wheels 41 are traveling.

In the rack cart 40, no roller elements are provided at the tensioned rods or cables 22 defining the racks 21; rather, an essentially rake-like holder 45 is provided which, in the illustrated embodiment, exhibits four arms 47 projecting downwardly from a beam 46. Freely rotatable backing rollers 48 are mounted to the arms 47 of the holder 45, and supporting and conveying rollers 49 engaging at the lower rim 8 of cut glass sheets 3 are attached to the free, lower ends of the arms 47. The supporting and conveying rollers 49 constitute the linear conveyor. As can be seen from FIG. 3, the holder 45 can be aligned with respect to each of the compartments 21 of the rack cart 40 in such a way that the supporting rollers 48 extend laterally and the conveying and supporting rollers 49 extend from below into the rack 21. The holder 45 can be aligned with respect to each rack 21 by moving the rack cart 40 in the direction of double arrow 30 and/or by moving the holder 45 proper.

In order to move the rack cart 40 of the embodiment according to FIGS. 3 and 4 in the direction of double arrow 30, a clutch 50 is provided at the cart by way of which the rack cart 40 can be coupled to a servo drive mechanism 51 designed in the illustrated embodiment as a rack-and-pinion drive.

A holder 45 with backing rollers 48 and optionally with supporting and conveying rollers 49 is also provided in the rack cart 20 according to FIG. 2. The rollers at the tensioned rods or cables 22 of the rack carts 20 can also be omitted. Such rollers can also be provided at the tensioned rods or cables 22 of the rack cart 40.

The liftable linear conveyor 31 (FIG. 2) can also be used in the embodiment of the rack carts 40 according to FIGS. 3 and 4. In this case, the supporting and conveying rollers 49 at the holder 45 can also be omitted.

If, for reasons of space or other considerations, it is undesirable to insert the cut glass sheets 3 from the lifting device 4 directly in the (first) rack cart 20 or 40, then an additional conveyor cart can be provided on which the cut glass sheets 3 are pushed from the lifting device 4 and which is then aligned with respect to the first rack cart 20. The conveyor cart consists of a simple undercarriage, the wheels of which can be guide rollers, or which is guided in tracks, and which exhibits a lateral supporting means, preferably an array of rollers, and a lower support for the cut glass sheets 3. The lower support for cut glass sheets 3 at the conveyor cart can consist of a roller track with drivable rollers in order to simplify the motions of the cut glass sheets 3.

In FIGS. 5 and 6, a further embodiment of the invention is illustrated in a front view and, respectively, a top view; in this case, the inclination of the conveying planes of the individual sorting devices by 3°-6° in the rearward direction has not been taken into account in FIGS. 5 and 6.

As can be seen from FIGS. 6 and 7, cut glass sheets are fed from a glass cutting facility to the lifting device 60 by way of the conveying table 1 equipped with endless conveyor belts 2. The lifting device 60 exhibits four groups of lifting arms 61 and 62 wherein the lifting arms 61 are shorter than the lifting arms 62. Supporting rollers 65 are mounted to the lifting arms 61 and 62, the cut glass sheets 3 resting on and rolling along these rollers when they are delivered from the conveying table 1 in the direction of arrow 63 (FIGS. 6 and 7).

The lifting device 60 exhibits slot-like reception zones 66 for the cut glass sheets 3, the reception zones 66 being bounded laterally by the lifting arms 61 and 62 and, respectively, their supporting rollers 65 and the base member 67 of the lifting device 60, and on the inside by a conveyor 64 fashioned as an endless conveyor belt.

Beside the lifting device 60, a vertical conveyor 70 is arranged, the conveying plane of which is rearwardly inclined by about 3°-6°. The vertical conveyor 70 consists of a base frame 71 with an essentially vertical sliding guide 72 aligned in parallel to the conveying plane rearwardly inclined by 3°-6° and at a right angle to the conveying direction. By way of appropriate guide means 73 and 74, a supporting frame 75 can be shifted upwards and downwards along this sliding guide 72 with the aid of drive means, not shown, e.g. hydraulic motors or piston-cylinder units. Supporting rollers 77 are rotatably mounted to the supporting frame 75 as well as on its horizontal lattice struts 76. Furthermore, a conveying means 78 fashioned as an endless conveyor belt is arranged at the lower end of the supporting frame 75. A rack cart 80 is located beside the vertical conveyor 70, this cart being displaceable forwards and backwards transversely to the conveying plane by way of wheels 81. The racks of the rack cart 80 are rearwardly inclined by the same angle as the conveying plane of the vertical conveyor 70, i.e. by about 3°-6°. In order to facilitate feeding of the individual cut glass sheets 3 into the compartments defined by rods or tensioned cables, a holder 82 is provided exhibiting struts 83 arranged in the manner of rakes. Supporting rollers 85 are mounted to the vertical legs 84 of the struts 83, the cut glass sheets 3 resting on these rollers during their transport into or through a compartment of the rack cart 80. For the vertical support of the cut glass sheets, a supporting beam 86 is provided which optionally carries drivable supporting rollers 87 associated with the vertical legs 84 (i.e. rearwardly inclined by about 3°-6°) of the struts 83. In addition, respectively one conveying roller or supporting roller 87 is furthermore arranged in the conveying direction in front of and after the rack cart 80, these rollers being likewise mounted at the supporting beam 86. The supporting beam 86 with driven supporting rollers 87 constitutes the linear conveyor.

The supporting beam 86 can be lifted and, respectively, lowered in the upward and downward directions whereby the conveying rollers 87 can be placed into contact and, respectively, out of contact with the bottom rim of a cut glass sheet 3.

The passage of a cut glass sheet 3 through the device for sorting in accordance with FIGS. 5-7 takes place as follows:

A cut glass sheet 3 is fed from a glass cutting table, not illustrated, in the direction of arrow 63 (FIGS. 6 and 7) to the conveying table 1 and from there conveyed further to the lifting device 60. The cut glass sheet 3 is transported into one of the receiving zones 66 of the lifting device 60, the corresponding lifting arms 61 and 62 forming with the conveying table 1 a conveying plane. The cut glass sheet 3 is conveyed into the reception zone 66 to such an extent that it comes into contact, with its forward rim, at the conveyor belt 64 which presently is at a standstill. The lifting device 60 now turns in the counterclockwise direction to such an extent that the lifting arms 61, 62 are inclined rearwardly by about 3° with respect to the vertical. The lifting arms 61, 62 and, respectively, their supporting rollers 65 lie in one conveying plane with the supporting rollers 77 of the vertical conveyor 70. The cut glass sheet 3 is moved on by the conveyor belt 64 of the lifting device 60 and the conveyor belt 78 of the vertical conveyor 70 until the cut glass sheet 3 is completely on the vertical conveyor 70. The supporting frame 75 of the vertical conveyor is now lowered along the sliding guide 72 until it is at the correct level with relation to the rack cart 80. This rack cart 80 has been positioned in the meantime, by shifting transversely to the conveying plane, in such a way that the cut glass sheet can be inserted in the desired compartment. For this purpose, the supporting beam 86 is lifted and the conveyor belt 78 of the vertical conveyor 70, which had been at a standstill during lowering of the supporting frame 75, is reactivated. The cut glass sheet 3 is inserted in a rack of the rack cart 80; the glass sheet is now supported on the supporting rollers 85 of the holder 82 and on the optionally driven conveying rollers 87 of the supporting beam 86 until it has been entirely pushed into a rack of the rack cart 80.

During this time, a new cut glass sheet 3 can already be inserted via the conveying table 1 in the lifting device 60 and tilted upwardly so that a continuous sorting of cut glass sheets 3 can be performed in the rack cart 80 or in several rack carts.

Also in the just-described embodiment of the apparatus according to this invention, several rack carts can be arranged in series as seen in the conveying direction, wherein each further rack cart is in every case associated with its own holder 45 or 82 or with a device operating in a similar way.

I claim:

1. In an apparatus for sorting cut glass sheets comprising a lifting device for cut glass sheets fed thereto on a conveying table, wherein the lifting device can be swiveled about an axis extending in parallel to a rim of the cut glass sheets and includes a conveyor means for transporting the cut glass sheets along one rim, and at least one rack cart having several racks for receiving respectively one cut glass sheet and movable transversely to the direction wherein cut glass sheets are delivered thereto, the improvement wherein at least one rack of the rack cart is associated with a linear conveyor for inserting a cut glass sheet in a rack; the remaining racks are associated with rotatable support elements for engaging with the rim of the cut glass sheets; and the rack cart is associated with a holder with supporting rollers, which can be brought into contact with a lateral surface of the cut glass sheets.

2. Apparatus according to claim 1, wherein the conveyor means include several conveyor belts for transporting the cut glass sheets in a direction transverse to the rim.

3. Apparatus according to claim 1, wherein the lifting device includes conveying rollers, said conveying rollers forming, in the position aligned in parallel to the conveying table, an end stop for the cut glass sheets being fed.

4. Apparatus according to claim 1, wherein several series-arranged rack carts are provided which can be moved independently of one another in a direction transverse to that of the cut glass sheets being delivered.

5. Apparatus according to claim 1, wherein said at least one rack cart is set up on an undercarriage which is movable with the aid of a drive mechanism in a direction transverse to that of the cut glass sheets being delivered.

6. Apparatus according to claim 1, wherein the linear conveyor is liftable and lowerable, and includes several conveying rollers, said linear conveyor adapted to be lifted into its operative position wherein it projects into a lower region of the rack.

7. Apparatus according to claim 6, wherein the linear conveyor is mounted to an undercarriage or on the floor.

8. Apparatus according to claim 1, wherein the rack cart has a bottom and wheels at said bottom, said wheels being received in guide rails; said rack cart having a clutch with which said rack cart can be adjusted with a drive mechanism for moving the rack cart in a direction transverse to that of the cut glass sheets being delivered.

9. Apparatus according to claim 1, wherein the racks of the rack cart are defined by tensioned rods or cables.

10. Apparatus according to claim 1, wherein the rotatable supporting rollers which contact a lateral surface of the cut glass sheets are provided at a lateral boundary of each rack.

11. Apparatus according to claim 6, further including spaced apart supports at a lower boundary of the racks for supporting the cut glass sheets.

12. Apparatus according to claim 11, wherein the conveying rollers of the linear conveyor are arranged between the supports and, respectively, the supporting rollers to be liftable and lowerable.

13. Apparatus according to claim 6, wherein the conveying rollers of the linear conveyor are mounted on a joint beam.

14. Apparatus according to claim 1, wherein the holder is transversely adjustable to the racks by moving at least one of the holder and the rack cart.

15. Apparatus according to claim 1, wherein the holder has the shape of a rake and is provided with arms projecting downwardly from a beam, and wherein the supporting rollers for engaging the rim of the cut glass sheets are provided at the lower ends of said arms.

16. Apparatus according to claim 15, wherein the supporting rollers are equipped with a drive mechanism.

17. Apparatus according to claim 1, further including a movable fixture for transporting cut glass sheets from the lifting device to the rack cart, said movable fixture being located between the lifting device and the rack cart.

18. Apparatus according to claim 17, wherein the fixture has a supporting frame for cut glass sheets, said frame including means for raising and lowering it.

19. Apparatus according to claim 18, further including supporting rollers rotatably mounted to the supporting frame for a cut glass sheet.

20. Apparatus according to claim 18, wherein the supporting frame further comprises a conveyor for engaging the rim of a cut glass sheet.

* * * * *